US008238663B2

(12) United States Patent
Kato (10) Patent No.: US 8,238,663 B2
(45) Date of Patent: Aug. 7, 2012

(54) SIMILAR IMAGE SEARCH APPARATUS AND COMPUTER READABLE MEDIUM (75) Inventor: Noriji Kato, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1029 days.

(21) Appl. No.: 12/190,619

(22) Filed: Aug. 13, 2008

(65) Prior Publication Data
US 2009/0097756 A1 Apr. 16, 2009

(30) Foreign Application Priority Data

Oct. 11, 2007 (JP) ................................. 2007-265842

(51) Int. Cl.
*G06K 9/00* (2006.01)
(52) U.S. Cl. ........ 382/181; 382/248; 382/176; 715/209; 705/3
(58) Field of Classification Search .................. 382/181, 382/218
See application file for complete search history.

(56) References Cited

U.S. PATENT DOCUMENTS

| 5,369,742 | A | * | 11/1994 | Kurosu et al. ................. 715/209 |
| 5,581,460 | A | * | 12/1996 | Kotake et al. ..................... 705/3 |
| 5,825,943 | A | * | 10/1998 | DeVito et al. ................. 382/306 |
| 6,522,782 | B2 | * | 2/2003 | Pass et al. ..................... 382/218 |
| 6,724,940 | B1 | * | 4/2004 | Qian et al. ..................... 382/253 |
| 6,804,683 | B1 | | 10/2004 | Matsuzaki et al. |
| 2004/0218836 | A1 | * | 11/2004 | Kanatsu ........................ 382/305 |

FOREIGN PATENT DOCUMENTS

| JP | 1-102685 A | 4/1989 |
| JP | 2001-155019 A | 6/2001 |
| JP | 2001-155026 A | 6/2001 |
| JP | 2004-173748 A | 6/2004 |

OTHER PUBLICATIONS

Jennifer G. Dy, et al., "Unsupervised Feature Selection Applied to Content-Based Retrieval of Lung Images", IEEE Transactions on Pattern Analysis and Machine Intelligence, vol. 25, No. 3, Mar. 2003, pp. 373-378.

* cited by examiner

*Primary Examiner* — Hadi Akhavannik
(74) *Attorney, Agent, or Firm* — Sughrue Mion, PLLC (57) ABSTRACT A similar image search apparatus includes a storage unit, a search unit, a text feature selection unit, an image feature transformation unit and a similar image search unit. The storage unit stores images and pieces of text information associated with the respective images. The search unit retrieves candidate images. Each candidate image has a similar image feature to a image feature of a key image. The text feature selection unit select a text feature of the respective candidate images which satisfies a given selecting condition. The image feature transformation unit, base on the selected text feature, transforms the image features. The similar image search unit retrieves similar images from the candidate images based on the transformed image features. The image features of the similar images are similar to the image feature of the key image.

10 Claims, 6 Drawing Sheets

| TEXT FEATURE VARIABLES | TEXT FEATURES (DEFINITION) | STATUS VALUE 1 | STATUS VALUE 2 | STATUS VALUE 3 |
|---|---|---|---|---|
| TF1 | CONTACTING A CHEST WALL | DESCRIBED | NOT DESCRIBED | — |
| TF1 | SHADOW LIKE GROUND GLASS | FOUND | NOT FOUND | NOT DESCRIBED |
| TF3 | CALCIFIED SHADOW | FOUND | NOT FOUND | NOT DESCRIBED |
| TF4 | BLOOD VESSEL CONNECTED SHADOW | FOUND | NOT FOUND | NOT DESCRIBED |
| | | | | |

FIG. 3

| IMAGE FEATURE CLUSTERS | CLUSTER CENTERS | CO-OCCURRENCE PROBABILITY OF TF1 | CO-OCCURRENCE PROBABILITY OF TF2 | ... |
|---|---|---|---|---|
| IF1 | CF1 | 0.12 | 0.75 | ... |
| IF2 | CF2 | 0.93 | 0.01 | ... |
| IF3 | CF3 | 0.02 | 0.05 | ... |
| IF4 | CF4 | 0.15 | 0.04 | ... |
| | | | | |

SIMILAR IMAGE SEARCH APPARATUS AND COMPUTER READABLE MEDIUM

CROSS-REFERENCE TO RELATED APPLICATIONS

This application is based on and claims priority under 35 USC 119 from Japanese Patent Application No. 2007-265842 filed Oct. 11, 2007.

BACKGROUND

1. Technical Field

The present invention relates to a similar image search apparatus and a computer readable medium.

2. Related Art

Digitized diagnostic images can easily be obtained by the propagation of medical equipment such as CT (computed-tomography) and MRI (magnetic resonance imaging) scanners, and by storing these diagnostic images as digital data, the diagnostic images can easily be managed and used commonly by medical practitioners or doctors. In addition, in many cases, diagnostic images so stored are managed with being associated with diagnostic reports which describe opinions on the diagnostic images and diagnostic results based thereon by doctors. Attempts have been made to make effective use of a data base of disease examples which has these diagnostic images and diagnostic reports.

As one example of such attempts, there is an attempt to increase the accuracy of diagnosis by searching a similar disease example to a diagnostic image of a patient from the data base and referring to a diagnostic result described in the disease example so searched.

SUMMARY

According to an aspect of the invention, a similar image search apparatus includes a storage unit, a search unit, a text feature selection unit, an image feature transformation unit and a similar image search unit. The storage unit stores images and pieces of text information described about the respective images, the images which are associated with the respective pieces of text information. The search unit retrieves candidate images from the images stored in the storage unit, each candidate image which has a similar image feature to a image feature of a key image. The text feature selection unit (i) extracts text features from the pieces of text information which are associated with the respective candidate images and (ii) selects a text feature which satisfies a given selecting condition from the extracted text features. The image feature transformation unit, base on the selected text feature, transforms (i) the image features of the candidate images and (ii) the image feature of the key image. The similar image search unit retrieves similar images from the candidate images based on the transformed image features of the candidate images and the transformed image feature of the key image. The image features of the similar images are similar to the image feature of the key image.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment for carrying out the invention will be described according to the drawings.

A similar image search apparatus according to an exemplary embodiment of the invention is an apparatus for searching for display a diagnostic image similar to a search key image which is a diagnostic image formed when a diseased portion of a patient is pictured by means of medical equipment such as a CT or MRI scanner from the past diagnostic images.

Figure 1:
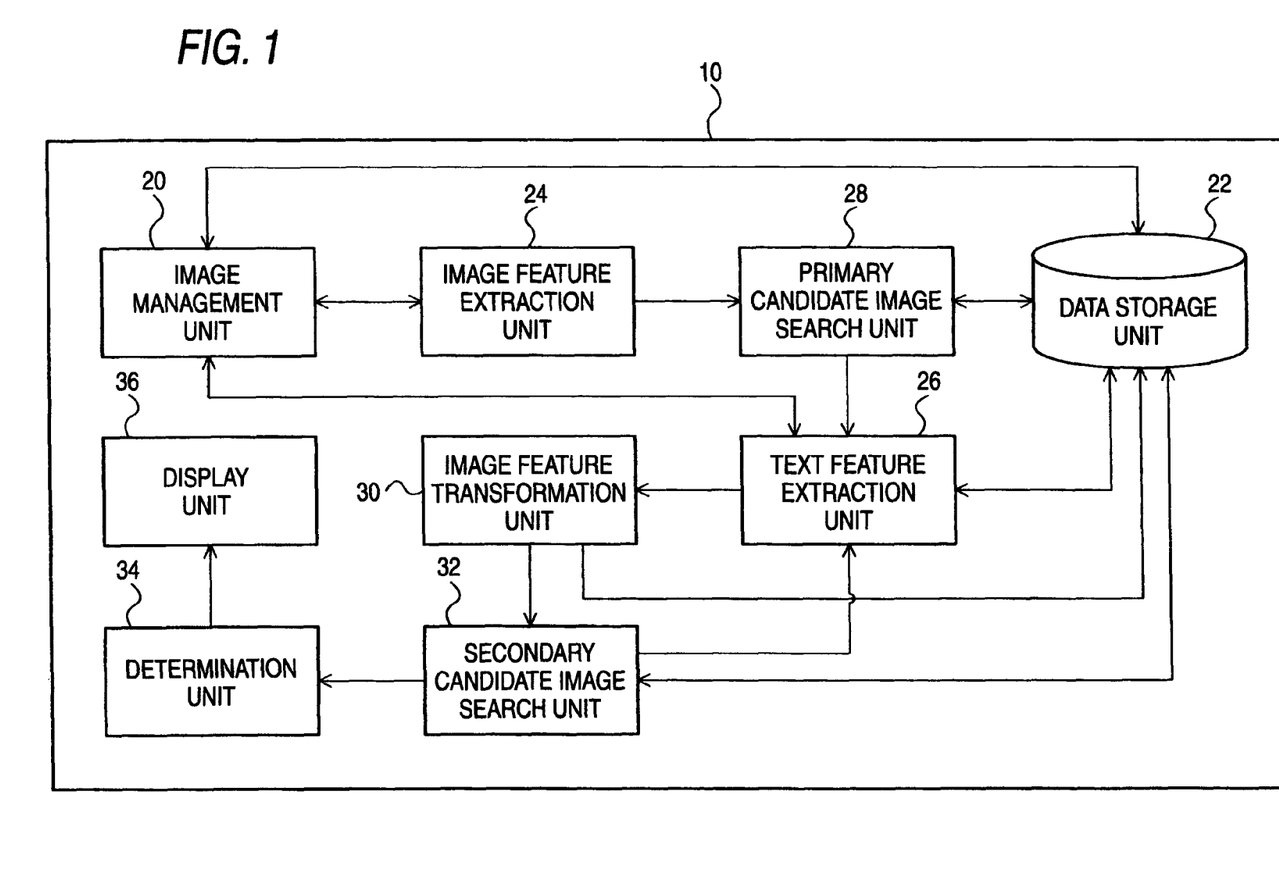
FIG. 1 is a functional block diagram of a similar image search apparatus according an exemplary embodiment of the invention.

FIG. 1 shows a functional block diagram of a similar image search apparatus 10 according to the exemplary embodiment. As is shown in FIG. 1, the similar image search apparatus 10 has an image management unit 20, a data storage unit 22, an image feature extraction unit 24, a text feature extraction unit 26, a primary candidate image search unit 28, an image feature transformation unit 30, a secondary candidate image search unit 32, a determination unit 34 and a display unit 36. The respective functions may be configured to be realized by the similar image search apparatus 10, as a computer system, operating in accordance with a computer program. In addition, the computer program may be configured so as to be stored in an information recording medium in any form that can be read by the computer including CD-ROM, DVD-ROM, flash memory or the like and be then read into the similar image search apparatus 10 by a medium recording unit, not shown. Additionally, the computer program may be configured so as to be downloaded into the similar image search apparatus 10 via a network.

The image management unit 20 stores (i) diagnostic images obtained in the past, (ii) diagnostic reports regarding the diagnostic images and (iii) analytical data obtained through analysis of the diagnostic images and the diagnostic reports in the data storage unit 22.

The diagnostic image may be formed into, for example, a DICOM (Digital Imaging and COmmunication in Medicine) type data, and information such as the ID of a patient and date and time of examination is stored in a header of the data.

The diagnostic report is text data which describes a diagnosis of a lesioned portion existing in the diagnostic image made by a doctor based on the diagnostic image and the name of a disease inferred from the results of his or her diagnosis.

The analytical data is data produced by the image management unit 20 based on the results of processing of information by the image feature extraction unit 24 and the text feature extraction unit 26, which will both be described later. Included in the analytical data are, for example, area information on a diseased portion for each diagnostic image and an image feature extracted from the diagnostic image, as well as data tables which will be described below.

Figure 2:
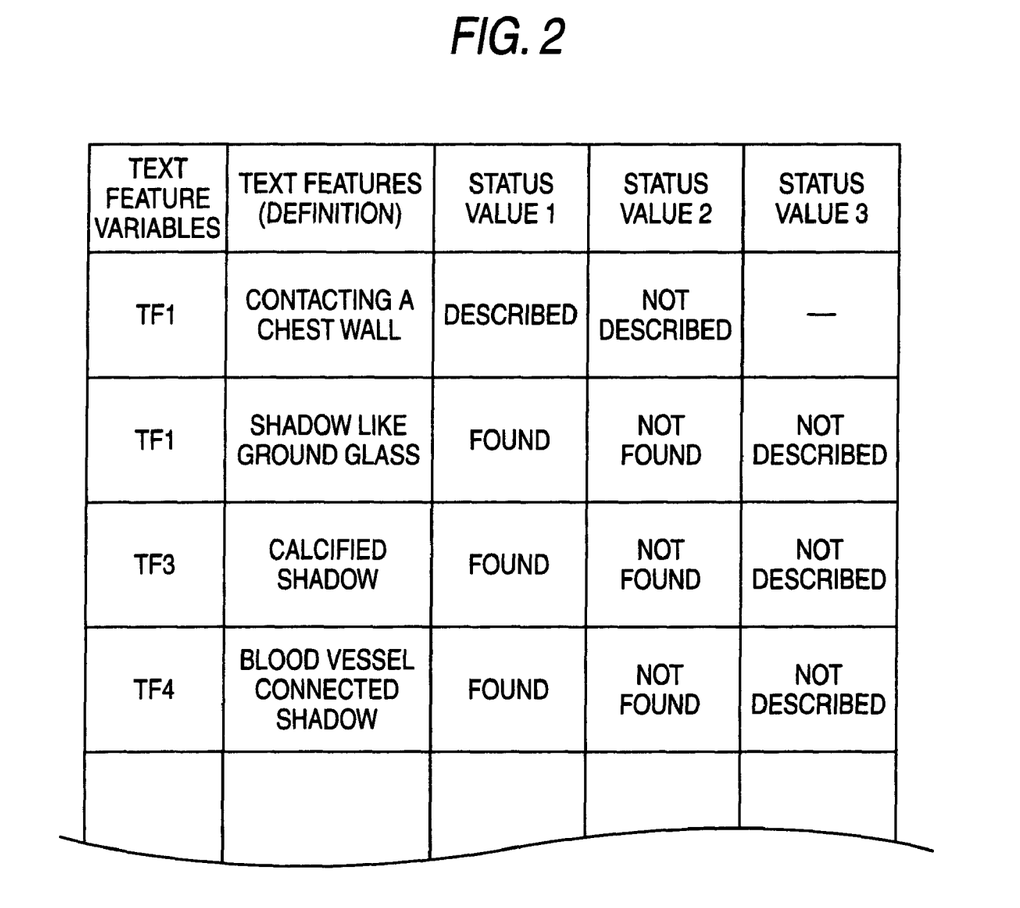
FIG. 2 is a diagram depicting an example of a text feature table.
Figure 3:
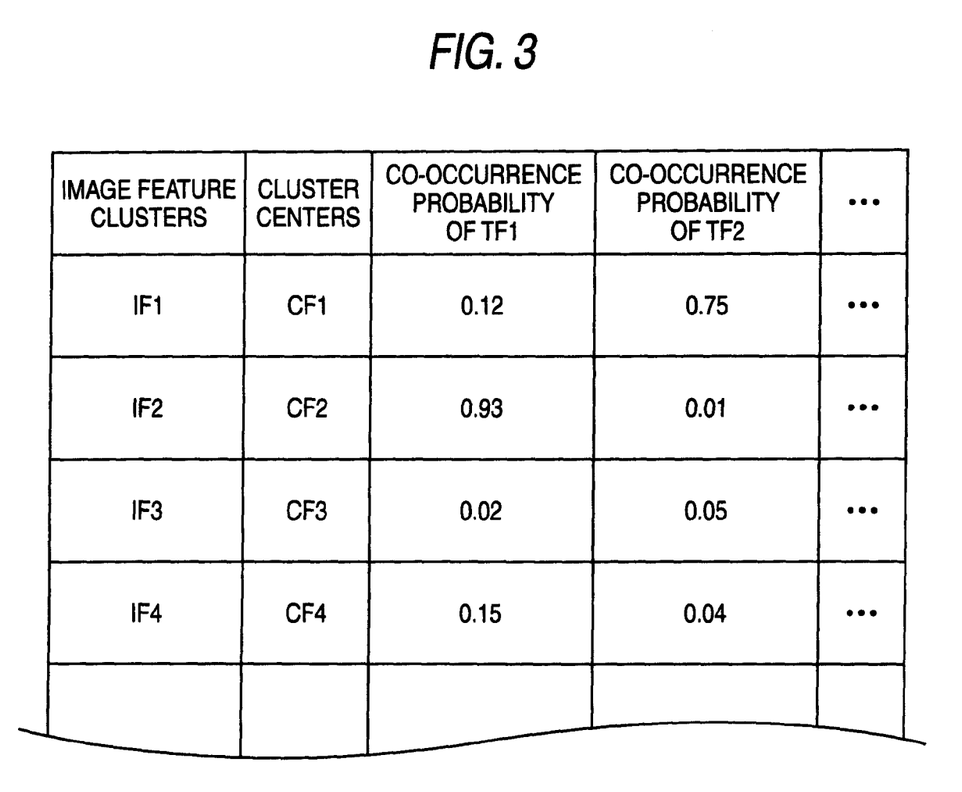
FIG. 3 is a diagram depicting an example of a text-image feature table.

The image management unit 20 (i) produces data tables shown in FIGS. 2 and 3 based on the diagnostic images stored in the data storage unit 22 and the diagnostic reports associated with the diagnostic images and (ii) stores the data tables so produced in the data storage unit 22.

FIG. 2 shows an example of a text feature table. A text feature table is produced based on key words (text features) showing diseased portions extracted from the past diagnostic reports stored in the data storage unit 22.

As is shown in FIG. 2, the text feature table of this exemplary embodiment is a data table in which descriptions regarding positional relationships of lesions like "contacting a chest wall" and descriptions regarding shapes of lesions like "ground glass-like shadow," "calcified shadow," and "blood vessel connected shadow" are extracted as text features, variables are set for those text features and status values that the variables can take are stored individually for the text features. A variable (a text feature variable) which is associated with a text feature regarding the positional relationship has two status values which indicate, respectively, that the text feature exists in the diagnostic report and that the text feature does not exist in the diagnostic report. On the other hand, a variable (a text feature variable) which is associated with a text feature regarding the shape of a lesion has three status values which indicate, respectively, that there is a description that a lesion of a specific shape has been found, that there is a description that no lesion of a specific shape has been found and that there is no description. The text feature table is produced by implementing the aforesaid analyses on all the diagnostic reports stored in the data storage unit 22.

FIG. 3 shows an example of a text-image feature associating table. The text-image feature associating table is a data table showing a relationship between a text feature obtained from a diagnostic report and an image feature vector obtained from a diagnostic image.

The text-image feature associating table is produced to associate a text feature with an image feature vector because the text feature is a discrete value based on whether or not the text feature exists in a diagnostic report, while the image feature vector is a continuous value which is extracted from a diagnostic image. Then, in this exemplary embodiment, image feature vectors obtained from plural diagnostic images stored in the data storage unit 22 are classified into a predetermined number of clusters (hereinafter, referred to as image feature clusters) using a known clustering method such as the k-Mean clustering, and the individual image feature vectors are discretized using center values (cluster centers) of the image feature clusters. The image feature vector of each diagnostic image is classified into an image feature cluster which has a shortest distance to the cluster center. In addition, the cluster center of the image feature cluster is saved as a representative value of the image feature vectors which are classified into the image feature cluster.

In addition, in the text-image feature associating table, the relationship between the image feature and the text feature is represented as a co-occurrence probability of the image feature cluster and the text feature. The co-occurrence probability of the image feature cluster and the text feature denotes probability with which a diagnostic report having a text feature is related to a diagnostic image having an image feature which is classified into an image feature cluster.

In the text-image feature associating table shown in FIG. 3, IF1, IF2, . . . are labels (classification) which represent image feature clusters which have been subjected to clustering, and CF1, CF2, . . . are means (cluster centers) of image feature vectors belonging to the corresponding image feature clusters. In addition, data stored in a third column, a fourth column, . . . of the text-image feature associating table are co-occurrence probabilities of the respective image feature clusters which have been subjected to clustering and text features TF1, TF2, . . . .

The data storage unit 22 includes a large capacity storage such as a hard disc and stores the aforesaid diagnostic images which were diagnosed in the past and the diagnostic reports regarding the diagnostic images, as well as analytic data obtained by analyzing the diagnostic images and the diagnostic reports.

The image feature extraction unit 24 specifies a portion of a diagnostic image from which an image feature is to be extracted and extracts an image feature from the specified portion. The specified portion may be (i) an area of the diagnostic image which has a specific luminance, (ii) an area where a difference from a diagnostic image of a health state constituting a criterion becomes equal to or more than a threshold. The specified portion may be directly specified by the user of the similar image search apparatus 10 using an input device such as a mouse.

Next, the image feature extraction unit 24 calculates an image feature from the extracted portion. Various types of feature values such as area of a lesioned portion, degree of complexness of shape, degree of approximation to oval and position of a lesioned portion, density-related feature values (density histogram, density mean value and density standard deviation), texture-related feature values (energy and entropy) may be used as image features to be calculated. These feature values may be made to be calculated by a known image processing method. In addition, the image feature vector which is the image feature of a diagnostic image is produced as a component of the calculated image feature.

The text feature extraction unit 26 extracts a description which includes a specific keyword as a text feature from a diagnostic report. The text feature extraction unit 26 may extract, as a text feature, a description which specifies a predetermined lesioned portion such as one describing that a shadow like a ground glass is found in a superior lobe of the right lung or that no tumor is found in the left lung.

These are processings which produce analytic data based on the diagnostic images and the diagnostic reports that were obtained in the past. Next, the function blocks will be described which perform processings to extract using a specified diagnostic image as a search key a similar image group which is supposed to have similar symptoms to that of the diagnostic image specified by the search key (hereinafter, referred to as a search key image) from the diagnostic images stored in the data storage unit 22.

The primary candidate image search unit 28 searches a similar image to the search key image from the past diagnostic images stored in the data storage unit 22 based on an image feature vector extracted from the search key image. Specifically, the primary candidate image search unit 28 compares the image feature vector of the search key image which is extracted from the image feature extraction unit 24 with image feature vectors of the individual diagnostic images stored in the data storage unit 22 and selects and obtains plural image feature vectors in which the degree of similarity of vector data is larger than a given threshold. The degree of similarity of two image feature vectors may be obtained as, for example, a reciprocal number of the Euclidean distance between the two image feature vectors. Then, the primary candidate image search unit 28 saves the image feature vectors so obtained in a primary storage unit (a working memory), not shown, and also obtains diagnostic reports associated with the similar image group having the obtained image feature vectors (hereinafter, referred to as a primary candidate image group) to be saved in the primary storage unit.

The text feature extraction unit 26 extracts text features from the diagnostic reports associated with the individual images of the primary candidate image group searched by the primary candidate image search unit 28 and obtains status values of the individual text features in the text feature table shown in FIG. 2. The text feature extraction unit 26 outputs to the image feature transformation unit 30, the obtained status values of the respective text features.

The image feature transformation unit 30 transforms, using information in the diagnostic reports, the image feature vectors of the individual diagnostic images extracted by the image feature extraction unit 24 in order to narrow down further the similar images to the search key image from the primary candidate image group searched by the primary candidate image search unit 28. Hereinafter, a transforming operation of the image feature vectors will be described.

Firstly, the image feature transformation unit 30 selects text features which are useful to discriminate the diagnostic reports from the individual text features inputted from the text feature extraction unit 26 based on the status values of these text features. In selecting text features which are useful to discriminate the diagnostic reports, the image feature transformation unit 30 calculates entropies Hi for all the diagnostic reports saved in the primary storage unit with respect to text feature variables i using the following expression (1).

$$H_i = -\sum_{x \in \Omega_i} P(x) \log P(x), \quad (1)$$
$$P(x) = N(x)/N$$

where, $\Omega i$ denotes all states where the text feature variables i can be obtained, N denotes the number of reports saved in the primary storage unit and N(x) denotes the number of diagnostic reports in which a status x of the saved report appears.

The fact that the entropy calculated with respect to a text feature is high means that the description of the text feature is diverse among a diagnostic report group extracted in such a manner as to be related to the primary candidate image group (hereinafter, referred to as a primary diagnostic report group). Consequently, since a text feature having a higher entropy becomes a feature which is effective in discriminating individual elements in the primary diagnostic report group, the image feature transformation unit 30 selects a text feature having an entropy which is equal to or higher than a predetermined value. In addition, since the diagnostic reports include descriptions of image features to which doctors paid attention from the viewpoint of discriminating diseases, it can be said that the selected text features reflect the professional knowledge of those doctors.

The image feature transformation unit 30 transforms to new feature data, respective image features of the search key image and the primary candidate image group obtained by the primary candidate image search unit 28 based on the text features selected in the way described above for comparison. Then, the image feature transformation unit 30 implements a image feature transforming operation using the text features selected in the way described above and the information in the text-image feature associating table stored in the data storage unit 22.

The image feature transformation unit 30 selects for the text features so selected, image feature clusters which have a large co-occurrence probability with the text features from the text-image feature associating table and obtains cluster centers (representative feature vectors) of the image feature clusters so selected. Here, when representative feature vectors $y_1, y_2, \ldots, y_N$ of N numbers are obtained, a new image feature vector z is calculated as an N-dimensional vector which adopts, as elements, distances from representative feature vectors of N numbers which are obtained with respect to the image feature vector x, as is shown in the following expression (2).

$$z = (\|x-y_1\|, \|x-y_2\|, \ldots, \|x-y_N\|) \quad (2)$$

A transforming operation of this new image feature vector is implemented on all the image feature vectors of the search key image and the primary candidate image group stored in the primary storage unit. Since the image feature vectors transformed by the image feature transformation unit 30 reflect the selected text features, the transformed image feature vectors not only reflect the degree of similarity of the images but also constitute feature data which is likely to facilitate the discrimination of a disease to which the information in the diagnostic reports is added.

The secondary candidate image search unit 32 calculates, based on the image feature vectors transformed by the image feature transform unit 30, degrees of similarity of the search key image and all the images of the primary candidate image group stored in the primary storage unit. In addition, the secondary candidate image search unit 32 searches images in which the calculated degree of similarity is equal to or more than a predetermined threshold, and the images so searched constitute a similar image group of the search key image (hereinafter, referred to as a secondary candidate image group).

Figure 4:
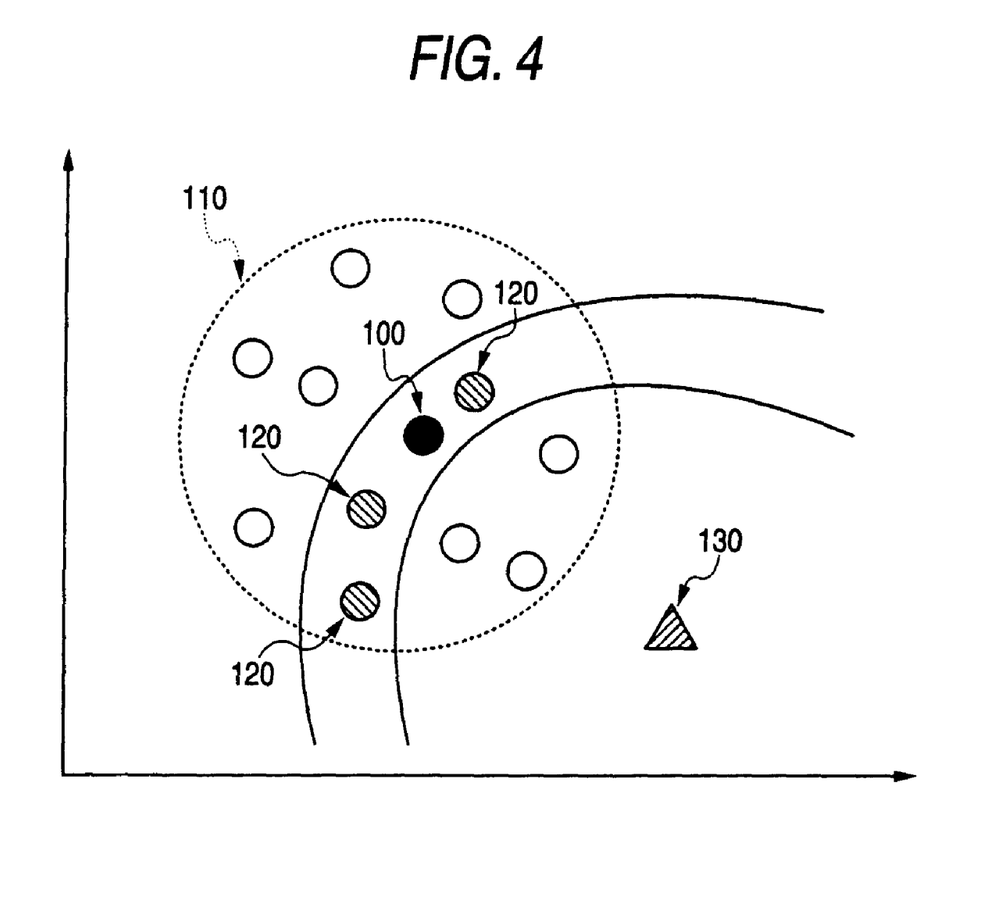
FIG. 4 is a diagram illustrating a relationship between a primary candidate image group and a secondary candidate image group.

Here, FIG. 4 shows a diagram which depicts a relationship between the primary candidate image group 110 searched by the primary candidate image search unit 28 and the secondary candidate image group 120 searched by the secondary candidate image search unit 32. As is shown in FIG. 4, since the primary candidate image group 110 searched by the primary candidate image search unit 28 have images which lie the short distance from the search key image 100, the images of the primary candidate image group 110 are distributed within a hyperspherical surface centered at the search key image 100 which is contained within a range indicated by a dotted line within an image feature space. On the other hand, since the secondary candidate image feature is a feature based on a distance from the cluster center 130 of the image feature cluster, images whose distance from the cluster center 130 of the selected image feature cluster is close to that of the search key image 100 (images held between two solid curved lines in FIG. 4) are selected as similar images (secondary candidate image group 120). In this way, in contrast to the primary candidate image group which is searched based only on the degree of similarity of image features, the secondary candidate image search unit 32 searches images using the image features which have been transformed based on the information in the diagnostic reports.

The determination unit 34 determines whether or not the secondary candidate image group searched by the secondary candidate image search unit 32 satisfies a predetermined ending condition. The predetermined ending condition may be such that for example, the number of elements of the secondary candidate image group is equal to or less than a predetermined threshold. In addition, in the event that the determination unit 34 determines that the predetermined ending condition is satisfied, the secondary candidate image group is displayed on the display unit 36 as a similar image group. On the contrary, in the event that the determination unit 34 determines that the predetermined ending condition is not satisfied, the secondary search described above may be executed recursively using the searched secondary candidate image group as a candidate image group.

The display unit 36 includes a display and displays the similar image group searched as the similar image to the search key image on the display.

Figure 5:
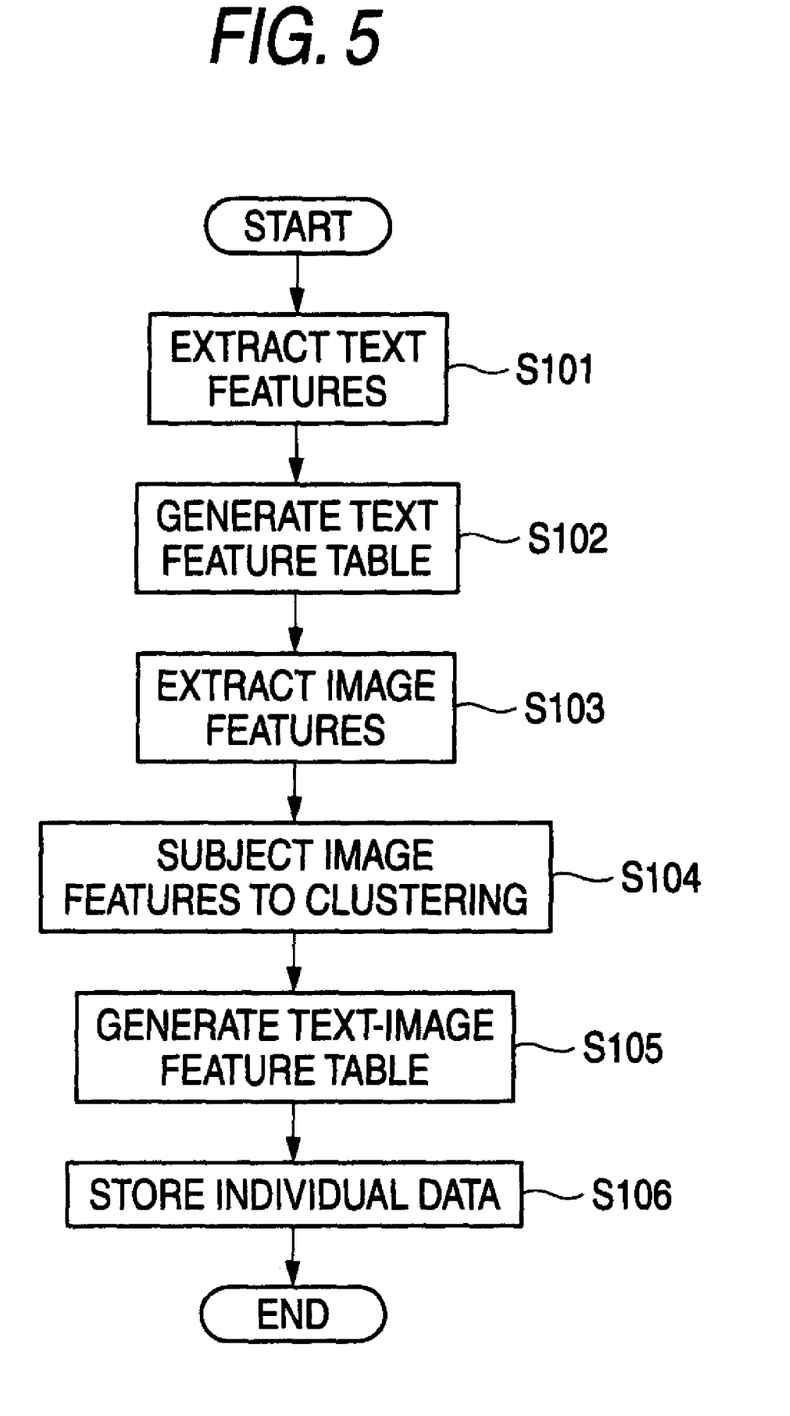
FIG. 5 is a flowchart of a preprocessing operation of a similar image search.
Figure 6:
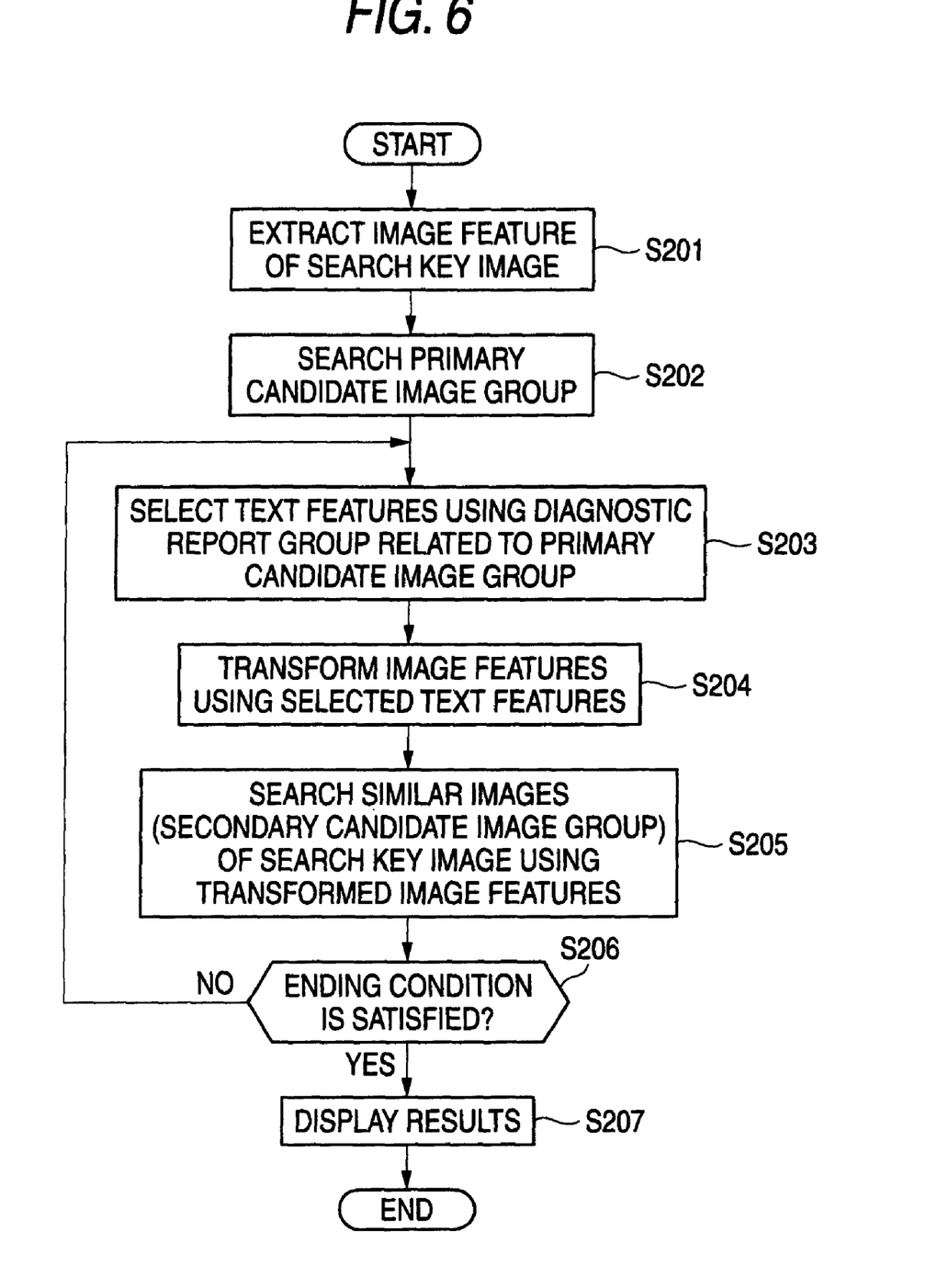
FIG. 6 is a flowchart of a similar image searching operation.

Next, referring to flowcharts shown in FIGS. 5 and 6, flows of a similar image search preprocessing operation and a similar image searching operation which are executed by the similar image search apparatus 10 according to the exemplary embodiment will be described below.

Firstly, referring to FIG. 5, a similar image search preprocessing operation will be described. The similar image search preprocessing operation starts with generation of analytic data such as table data from the past diagnostic images and diagnostic reports which are stored in the data storage unit 22 and ends with storage of the generated analytic data in the data storage unit 22.

The similar image search apparatus 10 extracts the text features which describe the lesioned portions from the past diagnostic reports accumulated in the data storage unit 22 (S101). The similar image search apparatus 10 sets text feature variables which are associated with the individual text features based on the text features so extracted, obtains status values that the set text features are likely to take from the diagnostic reports and generates a text feature table as shown in FIG. 2 (S102).

The similar image search apparatus 10 extracts image features of portions representing diseased portions from the past diagnostic images accumulated in the data storage unit 22 (S103). The similar image search apparatus 10 subjects the individual image features to clustering to generate plural image feature clusters based on the extracted image features (S104), obtains a probability with which the individual text features stored in the text feature tables are included in the diagnostic reports which are associated with the individual image feature clusters and generates a text-image feature table as shown in FIG. 3 (S105). Then, the similar image search apparatus 10 stores the image feature vectors of the individual diagnostic images, the text feature table and the text-image feature table which are generated thereby in the data storage unit 22 (S106), ending the preprocessing operation.

Next, referring to FIG. 6, a similar image search operation will be described. The similar image search operation is an operation for searching diagnostic images having similar disease examples to that of a diagnostic image which is specified as a search key image by the user from the diagnostic images accumulated in the data storage unit 22.

The similar image search apparatus 10 extracts an image feature vector from the specified search key image (S201) and searches a primary candidate image group made up of images having similar image feature vectors to the extracted image feature vector (S202) from the accumulated diagnostic images.

The similar image search apparatus 10 obtains status values of the individual text feature variables stored in the text feature table from the diagnostic report group which is related to the primary candidate image group and calculates an entropy of each text feature variable from the obtained status value. Then, the similar image search apparatus 10 selects a text feature which is associated with the text feature variable whose entropy so calculated is large (S203).

The similar image search apparatus 10 extracts an image feature cluster whose co-occurrence probability with the selected text feature is high from the text-image feature table and transforms the respective image feature vectors of the primary candidate image group and the search key image based on the distance to the cluster center of the extracted image feature cluster (S204). Then, the similar image search apparatus 10 searches an image group (a secondary candidate image group) whose image feature vector after the transformation is similar to that of the search key image from the primary candidate image group (S205).

The similar image search apparatus 10 determines whether or not the number of elements of the search secondary candidate image group is equal to or less than a predetermined threshold (S206) and repeats recursively the operations after S203 using the secondary candidate image group as a candidate image if the number of elements is determined not to be equal to or less than the predetermined threshold (S206: N), whereas if the number of elements is determined to be equal to or less than the predetermined threshold (S206: Y), the similar image search apparatus 10 displays the secondary candidate image group as the similar image to the search key image on the display (S207) and ends the operation.

According to the similar image search apparatus 10 according to the exemplary embodiment that has been described heretofore, the search of similar images by making full use of the accumulated knowledge is realized by searching from the primary candidate images which are similar to the search key image with respect to image feature the image which is similar further to the search key image with respect to the feature which reflects the opinions of doctors.

Note that the invention is not limited to the exemplary embodiment that has been described heretofore.

In the exemplary embodiment described above, while the similar image search apparatus 10 according to the invention is described as being applied to the technique for searching similar images based on the diagnostic images and diagnostic reports which are stored in the disease examples data base, the similar image search apparatus 10 can, of course, be applied widely to other systems for searching similar images from a data base which stores text data while relating them to images.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A similar image search apparatus comprising:
   a storage unit that stores images and pieces of text information described about the respective images, the images which are associated with the respective pieces of text information;
   a search unit that retrieves candidate images from the images stored in the storage unit, each candidate image which has a similar image feature to an image feature of a key image;
   a text feature selection unit that (i) extracts text features from the pieces of text information which are associated with the respective candidate images and (ii) selects a text feature which satisfies a given selecting condition from the extracted text features;

an image feature transformation unit that, based on the selected text feature, transforms (i) the image features of the candidate images and (ii) the image feature of the key image; and a similar image search unit that retrieves similar images from the candidate images based on the transformed image features of the candidate images and the transformed image feature of the key image, wherein image features of the similar images are similar to the image feature of the key image, and wherein the image feature transformation unit transforms (i) the image features of the candidate images and (ii) the image feature of the key image by generating transformed image feature vectors which reflect the degree of similarity of images and which constitute feature data likely to facilitate discrimination of a disease.

2. A similar image search apparatus comprising:

a storage unit that stores images and pieces of text information described about the respective images, the images which are associated with the respective pieces of text information;

a search unit that retrieves candidate images from the images stored in the storage unit, each candidate image which has a similar image feature to an image feature of a key image;

a text feature selection unit that (i) extracts text features from the pieces of text information which are associated with the respective candidate images and (ii) selects a text feature which satisfies a given selecting condition from the extracted text features;

an image feature transformation unit that, based on the selected text feature, transforms (i) the image features of the candidate images and (ii) the image feature of the key image; and a similar image search unit that retrieves similar images from the candidate images based on the transformed image features of the candidate images and the transformed image feature of the key image, wherein image features of the similar images are similar to the image feature of the key image, wherein the similar image search apparatus further comprises:

a setting unit that, when extracting text features from the pieces of text information stored in the storage unit, sets text feature variables associated with the extracted text features respectively, each text feature value which has at least one of predetermined status values; and a status value obtaining unit that selects one of the predetermined status values for the text feature variable based on each piece of text information, and wherein the text feature selection unit selects the text feature in which the corresponding text feature variable has large variance of the status values obtained by the status value obtaining unit.

3. A similar image search apparatus comprising:

a storage unit that stores images and pieces of text information described about the respective images, the images which are associated with the respective pieces of text information;

a search unit that retrieves candidate images from the images stored in the storage unit, each candidate image which has a similar image feature to an image feature of a key image;

a text feature selection unit that (i) extracts text features from the pieces of text information which are associated with the respective candidate images and (ii) selects a text feature which satisfies a given selecting condition from the extracted text features;

an image feature transformation unit that, based on the selected text feature, transforms (i) the image features of the candidate images and (ii) the image feature of the key image; and a similar image search unit that retrieves similar images from the candidate images based on the transformed image features of the candidate images and the transformed image feature of the key image, wherein image features of the similar images are similar to the image feature of the key image, wherein the similar image search apparatus further comprises:

a classifying unit that extracts image features from the respective images stored in the storage unit and classifies the extracted image features into image feature clusters;

a storing unit that stores individually a co-occurrence probability of the image feature cluster and the text feature which is represented by a probability with which the text feature is described in the text information stored in the storage unit while being related to the images having the image features which are classified individually into the image feature clusters; and an image-feature cluster selection that selects an image feature cluster based on the co-occurrence probability of the image feature clusters in relation to the text feature selected by the text feature selection unit, and wherein the image feature transformation unit transforms, based on a cluster center of the selected image feature cluster, respectively (i) the image features of the candidate images and (ii) the search key image.

4. The similar image search apparatus according to claim 3, wherein each image feature is vector data, and the image feature transformation unit transforms, based on a distance from the vector data of the cluster center to the vector data of each image feature, respectively (i) the vector data of the image features of the candidate images and (ii) the vector data of the search key image.

5. A similar image search apparatus comprising:

a storage unit that stores images and pieces of text information described about the respective images, the images which are associated with the respective pieces of text information;

a search unit that retrieves candidate images from the images stored in the storage unit, each candidate image which has a similar image feature to an image feature of a key image;

a text feature selection unit that (i) extracts text features from the pieces of text information which are associated with the respective candidate images and (ii) selects a text feature which satisfies a given selecting condition from the extracted text features;

an image feature transformation unit that, based on the selected text feature, transforms (i) the image features of the candidate images and (ii) the image feature of the key image; and a similar image search unit that retrieves similar images from the candidate images based on the transformed image features of the candidate images and the transformed image feature of the key image, wherein image features of the similar images are similar to the image feature of the key image, and wherein (i) the selection by the text feature selection unit, (ii) the transformation by the image feature transformation unit and (iii) the retrieval by the similar image search unit are recursively executed by regarding the similar images as new candidate images until a predetermined ending condition is satisfied.

6. The similar image search apparatus according to claim 5, wherein
the predetermined ending condition is that the number of similar images extracted by the similar-image search unit is equal to or less than a threshold.

7. The similar image search apparatus according to claim 1,
wherein each image is a diagnostic image formed when a diseased portion of a patient is pictured, and
each piece of the text information is a diagnostic report by a doctor in relation to the diagnostic image.

8. A non-transitory computer readable medium storing a program causing a computer to execute a process for searching a similar image, the process comprising:
storing, in a storage unit, images and pieces of text information described about the respective images, the images which are associated with the respective pieces of text information;
retrieving candidate images from the images stored in the storage unit, each candidate image which has a similar image feature to an image feature of a key image;
extracting text features from the pieces of text information which are associated with the respective candidate images;
selecting a text feature which satisfies a given selecting condition from the extracted text features;
transforming, based on the selected text feature, (i) the image features of the candidate images and (ii) the image feature of the key image; and
retrieving similar images from the candidate images based on the transformed image features of the candidate images and the transformed image feature of the key image,
wherein image features of the similar images are similar to the image feature of the key image, and
wherein the transforming comprises generating transformed image feature vectors which reflect the degree of similarity of images and which constitute feature data likely to facilitate discrimination of a disease.

9. The similar image search apparatus according to claim 1, wherein the extracted text features are keywords from a medical diagnostic evaluation of the images stored in the storage unit.

10. The non-transitory computer readable medium according to claim 8, wherein the extracted text features are keywords from a medical diagnostic evaluation of the images stored in the storage unit.

* * * * *